Feb. 24, 1925.
E. A. SPERRY
1,527,932
ALARM DEVICE FOR GYROCOMPASSES
Filed Aug. 11, 1917 2 Sheets-Sheet 1
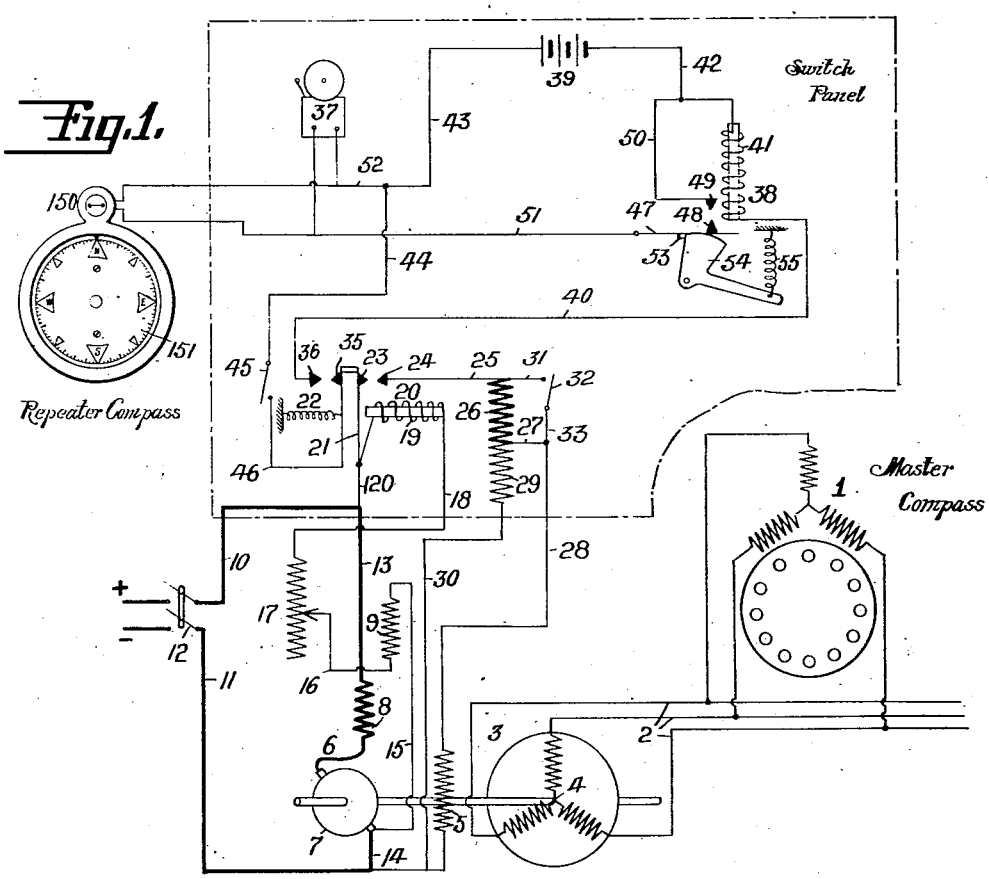
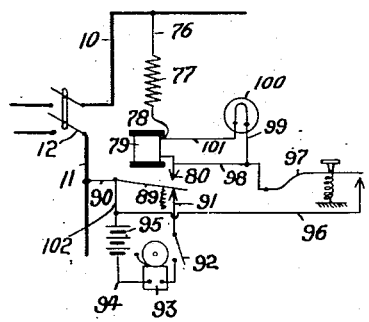
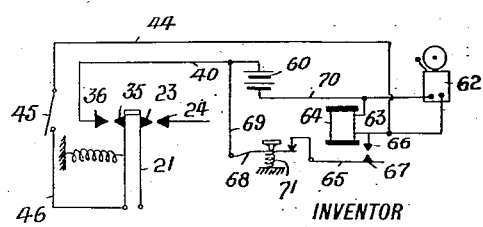
INVENTOR
*Elmer A. Sperry*
BY
*Herbert H. Thompson*
ATTORNEY Feb. 24, 1925.
E. A. SPERRY
1,527,932
ALARM DEVICE FOR GYROCOMPASSES
Filed Aug. 11, 1917
2 Sheets-Sheet 2

INVENTOR
Elmer A. Sperry.
BY
Herbert H. Thompson
ATTORNEYS

Patented Feb. 24, 1925.

1,527,932

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

ALARM DEVICE FOR GYROCOMPASSES.

Application filed August 11, 1917. Serial No. 185,719.

*To all whom it may concern:*

Be it known that ELMER A. SPERRY, a citizen of the United States of America, residing at 1505 Albemarle Road, Brooklyn, in the county of Kings and State of New York, have invented certain new and useful Improvements in Alarm Devices for Gyrocompasses, of which the following is a specification.

In driving gyroscopic apparatus, especially gyroscopic compasses, it is important that the gyro be kept running continuously and at a uniform speed. It is equally important that the operator be warned in the event of failure of the gyro driving means. As installed on a warship, the master gyroscopic compass is placed down near the central station, while the repeater compasses by which the vessel is actually steered, are placed in the pilot house and in other convenient locations. The pilot, of course, relies on the indication of the repeaters which in turn are entirely dependent upon the correct functioning of the master compass. Since the pilot is thus more or less out of touch with the master compass, it is doubly important that it be kept running. The most probable cause of failure of the driving means for the gyroscopic rotor is failure of the source of supply which supplies the energy to drive the gyro. It is also important that an indication once given should persist until an act is performed, preferably at the switchboard, (if an electrical system is utilized) by the operator; otherwise momentary failures of the driving means might be ignored and not remedied.

The present invention, therefore, aims to provide means for giving an indication on failure of the gyro driving means and preferably for causing the indication to persist until an act is performed by the operator.

The invention may be applied to various forms of gyro driving systems. Thus, I have illustrated it in connection with an electrical system as disclosed in my U. S. Letters Patent on "Electric drive for gyroscopes", No. 1,301,014, dated April 15, 1919, of which the present application is a continuation in part and also in connection with a pneumatic driving system.

Referring to the drawings which illustrate what I now consider the preferred forms of my invention:

Fig. 1 is a wiring diagram of one form of my invention applied to an electrical gyro driving system.

Fig. 2 is a diagram of a modified form of the invention.

Fig. 3 is a diagram of a further modification.

Figure 4:
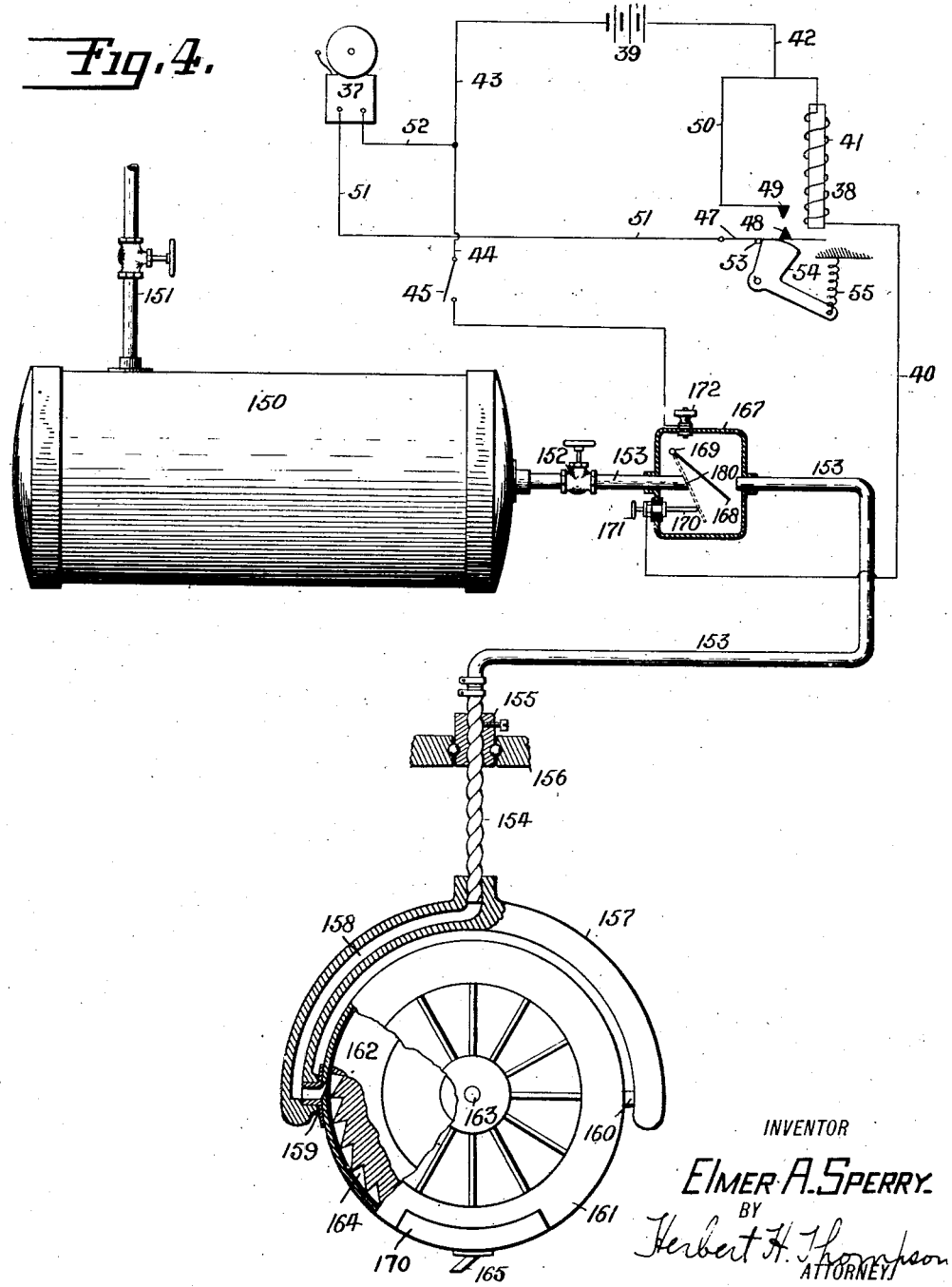
Fig. 4 is a partly diagrammatic view illustrating one form of my alarm system applied to a pneumatic gyro driving means.

On inspection of Fig. 1 it will be noticed that the latter is identical, except for reference characters, with Fig. 1 of my prior copending patent supra. The gyro driving system illustrated comprises a D. C. motor, a supply line, an A. C. generator and an induction motor.

The induction motor 1 employed for driving the gyro rotor is preferably a three phase one and is connected through conductors 2 to the armature 4 of an A. C. generator 3, preferably of the inductor-alternator type.

The field winding 5 of the latter is adapted to be excited from the D. C. supply line through a circuit hereinafter more specifically described. The generator 3 is mechanically coupled to the armature 7 of a compound D. C. motor 6. The latter comprises, besides armature 7 a series field winding 8 and a shunt field winding 9. The D. C. supply line is indicated at 10, 11 the main switch 12 being interposed therein. The armature 7 and winding 8 which are connected in series with each other are connected across the line wires 10, 11 by means of conductors 13, 14. The shunt field winding 9 is connected across the line wires 10, 11 through the following circuit: starting with line 10, through conductor 120, winding 19 of relay 20, conductor 18, rheostat 17, conductor 16, field winding 9, conductors 15 and 14 to line wire 11. The principal function of the field rheostat 17 is to vary the speed of motor 6, consequently the frequency of generator 3 and the speed of motor 1.

The relay 20 comprises an armature 21, biased to open position by means of a spring 22 and provided with a front contact 23 adapted to engage a contact 24 in the attracted position. The contacts 23, 24 are in series with the field 5 in the following circuit: starting with line wire 10, through conductor 120, armature 21, contacts 23, 24, conductor 25, resistance 26, conductors 27, 28, field winding 5 to the line wire 11. A resistance 29 is shown shunted around the field 5 to reduce the arcing at contacts 23, 24 and a switch 32 may be placed in parallel with resistance 26 by means of conductors 31 and 33 for a purpose mentioned hereinafter.

The operation of the system as disclosed thus far is substantially as follows: To start the gyro-rotor the switch 12 is closed. The motor 6 speeds up with comparatively little load as the field winding 5 is deenergized at this time, due to the fact that contacts 23, 24 are open. Although the relay 20 is energized simultaneously with motor 6. the flow of current through the relay winding 19 is retarded by the inductance in its circuit so that the closure of contacts 23, 24 is delayed until motor 6 has practically reached its operating speed. The contacts 23, 24 then close, causing the generator 3 to build up and to energize the motor 1 to start the gyro rotor. The initial load on generator 3 is comparatively small because of the fact that the motor 1 in starting produces a large lag between its impressed E. M. F. and the current which reacts on the generator 3 to hold down the generated E. M. F. of the latter. If for any reason the frictional resistance of the gyro rotor increases, as for instance, by a leakage of air into the rotor casing the torque of motor 1 may be increased by closing switch 32, thus increasing the impressed E. M. F. on the said motor 1.

The relay 20 possesses another important function. Should the line 10, 11 become dead the momentum of the rotor, being very high, would keep the latter operating for a comparatively long time, were there no braking force other than frictional resistance. However, let us assume that the line 10, 11 becomes dead and field circuit 5, 30 etc., is permanently closed. The motor 1 would act as a generator, driving generator 3 as a motor and motor 6 as a generator to supply current to the field 5 at a reduced voltage. Obviously this would throw a heavy load on machine 1, and thus the gyro rotor would rapidly come to rest. However, the relay 20 is so designed as to open the field circuit 5 as soon as the line potential drops below a predetermined amount thus effectively preventing the above described braking action.

When the line becomes dead or the line voltage falls to a value lower than that required to drive the gyro rotor at the desired speed, it is desirable, as mentioned before, to apprise the operator of this condition.

In Fig. 1 I show a form of indicating system controlled by the relay 20. This form comprises an indicator shown in the form of a bell 37, a separate source of E. M. F., such as a battery 39 and a relay 38. The armature 21 of relay 20 is shown as provided with a back contact 35 adapted to engage a fixed contact 36 when relay 20 is deenergized by falling off of the voltage of the line 10, 11. The contacts 35, 36 control the relay 38 through the following circuit: starting with battery 39 through conductor 42, winding 41 of relay 38, conductor 40, contacts 36, 35, conductor 46, manually operable switch 45, conductors 44, 43, back to battery 39. The relay 38 comprises an armature 47 biased to open position and provided with a front contact 48 adapted to engage a contact 49. The contacts 48 and 49 control the alarm 37 through the following circuit: starting with battery 39 through conductors 42 and 50, contacts 49, 48, armature 47, conductor 51, alarm 37, conductors 52 and 43 back to battery 39. As shown, the relay 20, alarm 37, and contacts are mounted on the switch panel which, of course, is located in the gyro compass room on the ship.

The operation of the alarm system thus far described is substantially as follows:— When the gyro driving system is operating the switch 45 is closed. If the voltage of the supply line 10, 11 drops to a dangerous value the relay 20 allows armature 21 to drop away thus closing contacts 35, 36 to energize the relay 38. Emergization of the latter causes contacts 48, 49 to close to cause energization of the alarm 37 to notify the operator. If the line voltage falls only momentarily the relay 20 picks up its armature on reestablishment of the normal line voltage, thus deenergizing relay 38. In the absence of any means except what has been above described the alarm 37 would cease ringing. Thus a series of short periods of slumping off of the voltage of the line would each cause only a momentary signal to be given. Under these conditions the operator might ignore the alarm through carelessness or otherwise, and fail to try to remedy the above described condition. I prefer to provide means whereby when the alarm is started it will persist until the operator goes to the switchboard and performs some act to cut it out. One form of such means is shown in Fig. 1. A lug 53 is provided on armature 47 against which a cam lever 54 normally bears. When the armature 47 is attracted by relay 38 the spring 55 causes the cam-lever to pass under the lug 53 and thus hold the contacts, 48, 49 closed whether winding 41 continues to be energized or not. As the relay 38 is usually placed on the switchboard the operator is compelled to go to said switchboard in order to release the armature 47 and thus stop the alarm. An additional signal in the form of a lamp 150 may be provided on the repeater compasses 151, if desired, to inform the pilot of the failure of the gyro driving means.

The repeater compass or compasses are, of course, located at a distance from the gyro compass room in the pilot house and at other convenient points of observation on the ship.

A slightly modified form of indicating system is shown in Fig. 2. The system shown in the last named figure may be used instead of the alarm system illustrated in Fig. 1. Contacts 35 and 36 of relay 20 may be used to control a "stick" relay 63 through the following pickup circuit: starting with battery 60 through conductor 70, winding 64 of relay 63, conductor 44, switch 45, conductor 46, contacts 35, 36 and wire 40 back to battery. The stick circuit of the relay 63 is as follows: battery 60, conductor 70, winding 64, front contacts 66 and 67, armature 65 and preferably through switch 68, then through conductor 69 back to battery 60. The indicator, again shown as a bell 62 may be shunted across the winding 64 of relay 63.

The operation of this form of the invention is substantially as follows: If the gyro is in normal operation, switch 45 is closed. If contacts 35, 36 close, due to falling off of the line voltage, the relay 63 is energized and picks up its armature 65, (which is biased to open position) to close the stick circuit. The last mentioned circuit maintains the relay 63 energized although the contacts 35, 36 may open again. The alarm 62 sounds and continues to sound as soon as and so long as relay 63 is energized. In order to stop the alarm the operator may pull down the armature 65 to open the contact 66, 67 or he may break the stick circuit by opening the switch 68 in the stick circuit. The switch 68, which may be located wherever desired, is preferably biased to closed position by suitable means such as a spring 71.

It will be noted that both of the alarm systems, shown in Figs. 1 and 2, are of the normally open type. A normally open alarm system is, in one respect, disadvantageous in that if any of the conductors of the alarm system are broken or the alarm battery or other source fails, the alarm would not operate. It may therefore be preferable to provide a normally closed alarm system. I have illustrated one form of a normally closed system in Fig. 3.

In the last mentioned form of the invention the contacts 35 and 36 of Figs. 1 and 2 are no longer utilized and may be dispensed with. A normally energized relay 78 is provided and connected to the line through the following circuit: from line wire 10, through 76 and if desirable a resistance 77, then through winding 79 of relay 78, front contact 80, armature 89, and conductor 90 to line wire 11. The indicator may assume the form of an electric lamp 100 shunted across the winding 79 by means of conductors 98, 99 and 101. One of said signalling means, preferably lamp 100 may be placed on one or all of the repeater compasses so that the pilot will also be informed as to failure of the source of supply for the compass.

The operation of this form of the invention is substantially as follows: When the switch 12 is closed and the gyro drive system energized the armature 89 is raised into engagement with contact 80. The last mentioned armature may be raised manually or may be raised by the relay 78 by momentarily closing an ordinary push button circuit closer shunted around the contact 80 and armature 89. By closing the push button 97 a circuit is established as follows: from line wire 10, through conductor 76, resistance 77, winding 79, conductor 98, push-button 97, conductors 96, 102, and 90 to line wire 11. The relay 78, after the armature 89 is picked up, is then energized through the same circuit as that last traced except that the current now goes through contact 80 and armature 89 instead of through the shunt including the push-button 97. The lamp is lighted when the relay 78 is energized as the former is in parallel with the latter. If the line voltage drops below the lowest value at which the gyro driving system will operate satisfactorily the relay 78 drops its armature thus breaking its own circuit and that of the signal lamp 100. The extinguishing of lamp 100 serves as a notification to the operator that the line is below voltage. After the armature 89 has dropped it will not be picked up by the relay even though the line voltage should come up to the normal value as the relay circuit is open at 80, 89. The lamp will therefore stay out until the armature 89 is raised manually or by energization of relay 78 by closure of push-button 97.

The system last described possesses the advantage that if the circuits of relay 78 or lamp 100 should open through breakage of a conductor, or otherwise, or if lamp 100 should burn out, a danger indication would be given. Although the alarm circuits are normally closed the resistance of the circuit 76, 77, etc., may be so designed as to consume very little energy.

If desirable an audible alarm may be provided in addition to the indicator 100. Thus an electric bell 93 may be connected to a back contact 91 of relay 78 and to a battery 95 or other auxiliary source of E. M. F. in the following circuit: starting with battery 95 through conductor 94, alarm 93, switch 92, back contact 91, armature 89 and conductor 102 back to battery 95. After switch 12 is closed and armature 89 picked up the switch 92 is closed. If the line voltage drops as mentioned above the armature 89 will engage contact 91 to close the bell circuit to cause the latter to sound.

As previously mentioned my invention is applicable, also, to pneumatically driven gyro-compasses. Thus, referring to Fig. 4, it will be seen that I show one form of my alarm combined with a pneumatic driving system. It is to be understood that the pneumatic system is largely diagrammatic and merely for the purpose of illustrating the combination as no claim is made to a driving system per se in this application.

The driving means, shown in Fig. 4 comprises a source of compressed fluid and what may be termed a rotor driving turbine. I have illustrated the source as a tank 150 which is adapted to contain compressed air supplied from a pump or other means (not shown) through a pipe 151. The tank 150 is connected, by means of a pipe or tube 153 to the rotor driving turbine. A valve 152 may be interposed in the pipe 153 to control the passage of fluid to the rotor. The pipe 153 is shown as terminating in a flexible tube 154 which serves not only as a flexible fluid supplying element but also as a torsion element to support the compass rotor 162. The upper end of the tube portion 154 is mounted in a block 155 which may be connected to a follow-up system as is well known in the gyro compass art. The block 155 is journaled in a member 156, ball bearings being provided to decrease the friction. The lower end of the tube portion 154 is secured to a bail 157 which pivotally supports the gyro casing 161 by means of pivots 159 and 160 secured to said casing. The rotor 162 is mounted within the casing 161 for rotation about a normally horizontal shaft 163. The rotor and casing are pendulous about axis 159—160 as indicated by weight 170.

For the purpose of driving the rotor the latter may be provided around its periphery with cut out portions 164 which serve as buckets or blades. In order to supply the driving fluid to the rotor one side of the support 157 is provided with a central tube-like recess 158 which communicates at one end with the tube portion 154 and at its other end with one end of the hollow pivot
159. The latter is so shaped at its inner end as to form an upwardly directed nozzle projecting into the gyro casing. An outlet 165 is provided on the gyro casing for the purpose of exhausting the driving fluid.

The operation of this form of driving means is quite simple. The valve 152, when open, allows the fluid to pass from the supply source 150 through pipe 153, flexible tube 154, recess 158, hollow pivot 159. The fluid then impinges on the blades or buckets 164 rotating the rotor 162 and passing out at outlet 165.

In order to give an indication on failure of the source of supply a circuit closer may be utilized and controlled by the flow of fluid through pipe 153. One form of such controller is shown in Fig. 4 and may be described briefly as follows:

A fluid-tight casing 167 is interposed in pipe 153 within which casing a vane 168 is pivoted at 169. The vane 168 is adapted to seat against the end 180 of the pipe 153 when the flow through the latter fails. In this position the vane engages a contact 170 mounted in, but insulated from, one of the walls of the casing 167 and provided at its outer end with a binding post 171. The vane 168, which is of metal is, of course, in electrical connection with the casing 167 which is also of metal. A binding post 172 secured to the casing 167, in electrical engagement therewith thus forms one terminal of the circuit controller of which the other terminal is at 171.

Obviously if the flow of fluid to the gyro is maintained the vane 168 will assume the full line position while if the flow fails or falls below a predetermined value the vane will drop to the dotted line position thus closing a circuit between 171 and 172.

While either of the types of alarm systems shown in Figs. 1 and 2 might be employed with the circuit controller shown in Fig. 4, I have illustrated the form shown in Fig. 1 as I consider this, at present, the preferred form. The alarm system shown in Fig. 4 needs no detailed description, it being sufficient to say that it is identical to that shown in Fig. 1 except that contacts 36 and 35 of Fig. 1 are replaced by terminals 171 and 172 in Fig. 4.

In accordance with the provisions of the patent statutes, I have herein described the principle of the operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. In an indicating system for gyroscopic compasses, a gyroscopic compass rotor driving means, a source of supply therefor, a repeater compass associated with said gyroscopic compass, a signal adjacent said repeater, a movable member for actuating said signal, means for moving said member into position for actuating said signal upon failure of said source, and means independent of said source or its restoration after failure and responsive to movement of said member into said position for holding said member in said position, whereby said signal will be continued until said movable member is manually restored to its normal position.

2. In an indicating system for gyroscopic compasses, gyroscopic compass rotor driving means, a source of supply therefor, a repeater compass associated with said gyroscopic compass, a signal adjacent said repeater, a movable contact and a contact engageable thereby, said contacts being in circuit with said signal, means responsive to failure of said source for moving said movable contact into engagement with the other contact to cause actuation of said signal, and means independent of said source or its restoration after failure and responsive to such movement of said movable contact for maintaining the latter in engagement with said other contact, whereby said signal will be continued until said movable member is manually restored to its normal position.

In testimony whereof I have affixed my signature.

ELMER A. SPERRY.